United States Patent [19]

Kromrey

[11] Patent Number: 5,009,823

[45] Date of Patent: Apr. 23, 1991

[54] METHOD OF MOLDING A CARBON-CARBON COMPOSITE

[75] Inventor: Robert V. Kromrey, Campbell, Calif.

[73] Assignee: United Technologies Corporation, Hartford, Conn.

[21] Appl. No.: 574,554

[22] Filed: Aug. 27, 1990

Related U.S. Application Data

[63] Continuation of Ser. No. 907,942, Sep. 10, 1986, abandoned.

[51] Int. Cl.⁵ .............................................. B29C 43/10
[52] U.S. Cl. .................................. 264/29.7; 264/29.1; 264/313; 264/325
[58] Field of Search ...................... 264/29.5, 313, 316, 264/325, 500, 544, 570, 29.1, 29.7; 425/78, 387.1, 405.1, 405.2, 407, DIG. 14, DIG. 44

[56] References Cited

U.S. PATENT DOCUMENTS

| | | | |
|---|---|---|---|
| 3,054,769 | 12/1962 | Pike | 523/210 |
| 3,068,194 | 9/1962 | Pike | 524/255 |
| 4,070,343 | 1/1978 | Kishimoto et al. | 524/588 |
| 4,409,048 | 10/1983 | Hatch et al. | 264/29.5 |
| 4,581,391 | 4/1986 | Baldwin et al. | 523/179 |
| 4,686,271 | 8/1987 | Beck et al. | 264/176.1 |

FOREIGN PATENT DOCUMENTS 2134168  1/1973  Fed. Rep. of Germany ...... 264/320

Primary Examiner—James Lowe

[57] ABSTRACT

A method of making a high strength carbon-carbon utilizing a solid flowable particulate polymer as a pressurizing medium. A resin impregnated carbon fiber reinforced prepreg is disposed in a pressure vessel and the vessel is substantially filled with a solid flowable particulate polymer. The prepreg is exposed to sufficient temperatures and pressures to cure the prepreg to form a carbon-carbon precursor which is subsequently exposed to temperature and pressures sufficient to postcure the carbon-carbon precursor. The post-cured carbon-carbon precursor is exposed to temperatures and pressures sufficient to carbonize said post-cured carbon-carbon precursor to form a carbon-carbon composite.

6 Claims, 1 Drawing Sheet

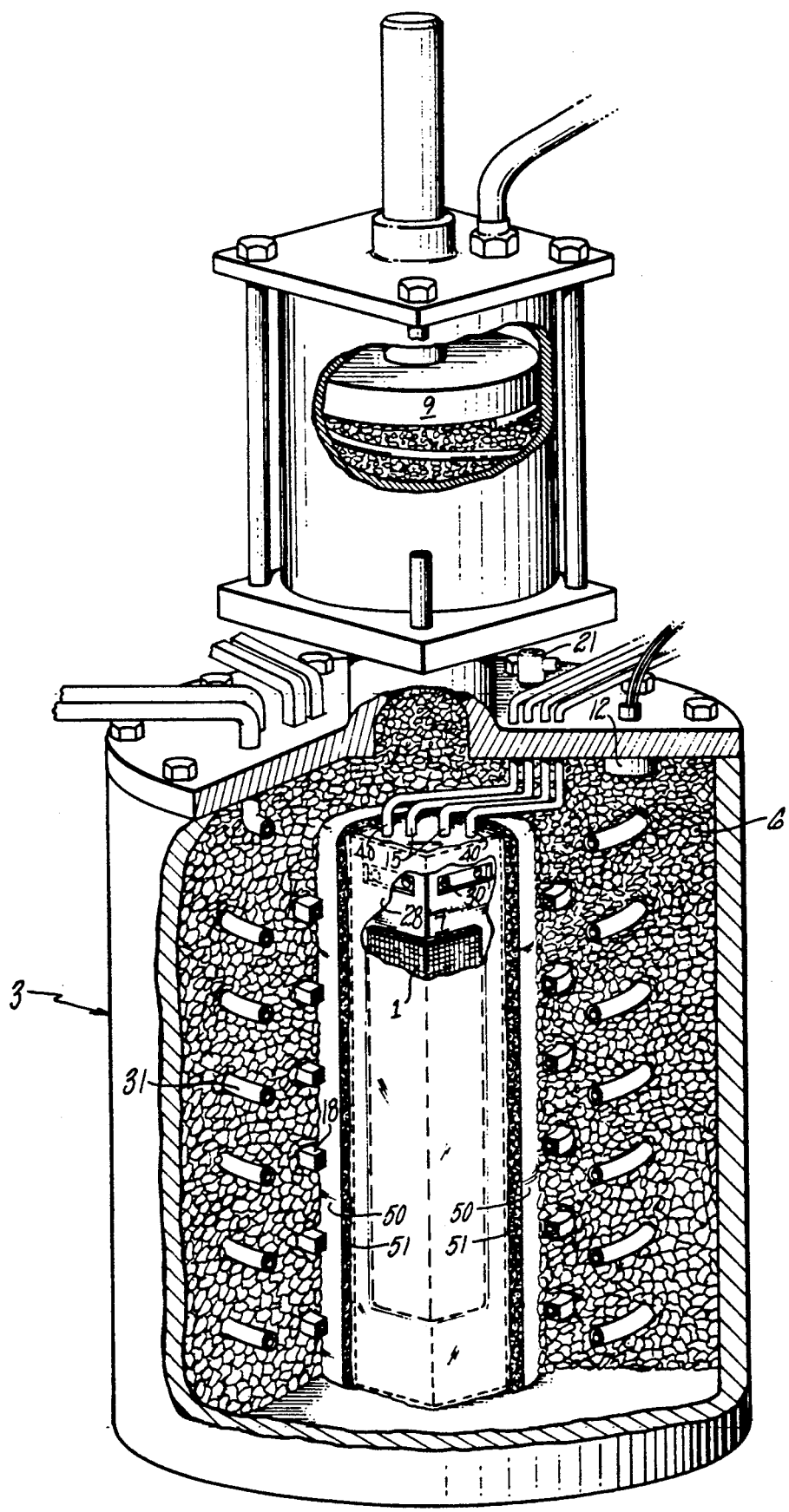

METHOD OF MOLDING A CARBON-CARBON COMPOSITE

This is a continuation of Ser. No. 907,942, filed Sept. 10, 1986 and now abandoned.

CROSS REFERENCE

This application relates to commonly assigned copending applications Ser. No. 829,048 filed Feb. 13, 1986, entitled "Molding Method and Apparatus Using a Solid, Flowable, Polymer Medium" and now abandoned; and Ser. No. 907,959 entitled "Solid Flowable Polymer Molding Medium", now abandoned; Ser. No. 907,943 entitled "Solid Flowable Polymer Medium with Metal Additives and Method of Molding Using Same", now U.S. Pat. No. 4,755,343; Ser. No. 907,946 entitled "High Temperature Solid Flowable Polymer Medium and Method of Molding Using Same"; Ser. No. 907,947 entitled "Method for Molding Using a Dual Solid Flowable Polymer System", now U.S. Pat. No. 4,770,835; Ser. No. 907,952 entitled "Method for Recovering a Solid Flowable Polymer Medium", now Pat. No. 4,839,392; Ser. No. 907,955 entitled "Solid Flowable Medium Having a Thermal Stability Additive and Method for Molding Using Same"; Ser. No. 907,958 entitled "Method of Vacuum Bagging Using a Solid FLowable Polymer" now U.S. Pat. No. ,4,755,341; Ser. No. 907,954 entitled "Improved Method of Fabricating Tubular Composite Structures now Pat. No. 4,704,240; and Ser. No. 907,957 entitled "Solid Flowable Polymer Medium with U.V. Detectable Additive and Method for Molding Using Same" now U.S. Pat. No. 4,772,437, filed on even date herewith, which disclose material related to that contained herein, the disclosures of which are hereby incorporated by reference.

TECHNICAL FIELD

The field of art to which this invention pertains is methods of molding carbon-carbon composites.

BACKGROUND ART

Carbon-carbon materials are produced starting with organic precursor fibers such as polyacrylonitrile, rayon or pitch. Such fibers are usually produced in bundles (roving or yarn), often by an extrusion process. The precursor fibers are heated in an inert atmosphere to pyrolyze or carbonize them and may then be heated to a higher temperature (e.g. greater than 4000° F., 2204° C.) to form graphite fibers. These carbon or graphite materials may then be laid down, woven, or interleaved to form what are referred to as 1D, 2D, 3D, ... nD etc. structures where D stands for direction and n stands for number of directions (i.e. in a 2D structure fibers are laid in two (typically orthogonal) directions).

These woven structures can then be cut to the length and width desired to form composite components (e.g. gas turbine engine components, aircraft brakes, rocket nozzles) and then stacked in a die or on a mold for treatment. The woven structures can be stacked with alternate layers of resin or pitch material or preferably the woven structures may be first impregnated with the resin, typically under pressure, and then laid up on a form or stacked in a mold to form a prepreg. The material is then heated to cure the resin binder forming a fiber reinforced precursor composite part. The part is then pyrolyzed and sometimes graphitized. Optional repeated impregnation steps followed by pyrolysis and graphitization steps can be employed to increase density (e.g. redensification). An alternative processing scheme is to use CVD to deposit pyrolytic graphite to densify the structure after the initial cure and carbonization cycles have been done.

There can be problems with present carbon-carbon manufacturing processes because during the molding and subsequent steps (e.g. curing, post-curing and pyrolization). For example, resin shrinkage in the composite can cause internal stresses, resulting in delaminations and cracking.

Accordingly, there has been a constant search for improved methods of molding carbon-carbon composites.

DISCLOSURE OF INVENTION

This invention is directed to a method of making high strength carbon-carbon composites. The method comprises disposing a resin impregnated carbon fiber reinforced prepreg in a pressure vessel and the vessel is substantially filled with a solid flowable particulate polymer. The prepreg is exposed to sufficient temperatures and pressures to cure the prepreg to form a carbon-carbon precursor which is subsequently exposed to temperatures and pressures sufficient to post-cure the carbon-carbon precursor. The post-cured carbon-carbon precursor is exposed to temperatures and pressures sufficient to carbonize said post-cured carbon-carbon precursor to form a carbon-carbon composite.

This process provides a significant advance to carbon-carbon technology by providing a short process that makes carbon-carbon composites having high strength by utilizing a solid flowable particulate polymer as a pressurizing medium.

The foregoing and other objects, features and advantages will be apparent from the specification, claims and from the accompanying drawings which will illustrate an embodiment of the invention.

BRIEF DESCRIPTION OF DRAWING

The FIGURE illustrates a perspective view cutaway of an apparatus for performing the molding method of the present invention by controlling the temperature and pressure of the pressurizing polymer medium.

BEST MODE FOR CARRYING OUT THE INVENTION

The FIGURE illustrates a method according to the present invention. Preimpregnated carbon fibers or woven fabric layups are formed (e.g. by weaving, filament winding and tape wrapping) from carbon or graphite fibers. The layups are impregnated with a resin (e.g. phenolic). At least two (a plurality) of the prepreg plies 1 are stacked and placed in a pressure vessel 3 (e.g. stainless steel, alloy steel) and surrounded with a polymer medium (medium) 6, optionally containing metal particles to increase the thermal conductivity of the medium as disclosed in commonly assigned copending U.S. application Ser. No 907,942 entitled "Solid Flowable Polymer Medium with Metal Additives and Method of Molding Using the Same", the disclosure of which is hereby incorporated by reference. It is preferable to have a barrier layer 28 between the medium and the article to avoid contamination of the composite and medium. Unlike a vacuum bag, this layer does not have to be air tight. An exemplary material is conventional aluminum foil. The barrier layer can cover a glass fabric breather layer which is in communication with a vacuum line 40 via gas vent 30. This may be used to remove volatiles from the article. Preferably, two polymer media are used in a coaxial system separated by another barrier layer 50 (e.g. aluminum foil) with the higher temperature medium 51 disposed next to the composite. Typically, less than about 5.1 centimeters (cm) (two inches) of high temperature medium is sufficient. This allows greater use of lower cost medium. The medium may be in contact with more or less of the composite precursor as is desired. Typically, the surface area of the composite precursor 1 not in contact with the medium is disposed (e.g. in contact) next to a tool 7 in order to provide (or maintain) a particular shape to the article 1. A pressurizer (e.g. mechanical piston) 9 can apply the requisite, uniformly distributed medium pressure to the article precursor. However, the pressure is preferably accomplished via the thermal expansion of the low temperature polymer medium 6. Such things as conventional pressure transducers 12 can be inserted in various places within the pressure vessel 3 to detect the requisite pressure. While any pressure can be used with the present invention, typically pressures up to 20.67 MegaPascals (MPa) (3000 psi) are required for molding carbon-carbon composite materials. However, it is believed pressures up to 138 MPa (20,000 psi) could be used.

Resistance heaters 15 and preferably induction heating means 18 are used to form (e.g. cure, carbonize, graphitize, etc.) the composite to be molded 1. By raising the temperature of the tool or susceptor the heat is transferred to the article. Preferably, a fluid heating/cooling means 31 is used to change the pressure via the large thermal expansion of the pressurizing medium. Typically, the temperature used to expand the pressurizing medium is much less than that used to cure the article precursor. Regulation of this pressure increase can be achieved through a relief valve 21, piston 9 and/or fluid heating/cooling means 31. Thus, tubing 31 can be used alternately to heat or cool the medium depending on whether hot or cold fluids are passed through the tubing to control the pressure independently of the temperature in the cure region.

The term carbon-carbon precursor refers to the composite article during any of its heating stages through post-cure. Typically, carbon-carbon composites are heated over extended time periods under gradually increasing temperatures. Generally, this is described in terms of four stages, cure, post-cure, carbonization and optional graphitization. However, there is no clear definable limit to the stages and the whole process may simply be considered as exposure to increasing temperatures. During the cure step, the resin is cured typically under pressure and the composite takes a shape. The post-cure step occurs at higher temperatures and acts to relieve stresses and allow internal gases to percolate to the surface of the article and escape without causing defects. The carbonization (pyrolization) stage pyrolizes the carbon-based resin destroying it, in an orderly fashion, and converting it to carbon. The graphitization step converts the carbon to graphite. The following temperature cycle although exemplary is preferred for the phenolic resins. These temperature stages are cure, about 149 degrees centigrade (°C.) to about 163° C.; post-cure, about 204° C. to about 260° C.; carbonization, about 538° C. to about 816° C.; and graphitization, about 1927° C. to about 2760° C. At each of these stages, the use of a solid flowable polymer as a pressurizing medium provides advantages and thus although the preg is preferably disposed in the pressure vessel with the medium during all of the above stages, the medium may be present at any or all "stages" (e.g. during a portion or all of the carbon-carbon process). The following temperature, pressure and time sequences are exemplary, however preferred for the phenolic resins.

It is preferred that the carbon-carbon precursor composite is cured at temperatures of about 149° C. to about 163° C. at pressures of about 6.89 MPa to about 20.67 MPa over a time of about 3 hours to about 6 hours. During this stage, conventional phenolic resins cure by condensation reactions. When water or organics are evolved at these temperatures, the parts are subject to delamination if sufficient external pressure is not maintained. The presence of the pressurizing medium reduces these problems. High molding pressures also ensure high density and low porosity.

It is preferred that the carbon-carbon composite is post-cured at temperatures of about 204° C. to about 260° C. at pressures of about 6.89 MPa to about 20.67 MPa over a time period of about 4 hours to about 16 hours. A carbon reinforced phenolic article is subject to very high internal stresses during post cure due to resin cure and cooldown shrinkage. When the resin in the composite is heated above its cure temperature, the resin becomes fragile and cheesy. The strength and modulus drops and the resin cracks easily. These internal stresses can cause interlaminar failures. The presence of the pressurizing medium reduces these problems.

It is preferred that the carbon-carbon composite is carbonized (pyrolized) at temperatures of about 538° C. to about 816° C. at pressures of about 6.89 MPa to about 20.67 MPa over a time period of about 4 hours to about 16 hours. During this stage, the presence of the polymer medium reduces the following exemplary problem. Thermal destruction of the matrix resin in the composite precursor results in significant gas evolution. This gas pressure can become excessive if trapped, and blisters and delaminations can occur if sufficient external pressure is not maintained on the part to offset internal gas pressure generated by the pyrolization process.

It is preferred that the carbon-carbon composite is graphitized at temperatures of about 1927° C. to about 2760° C. at pressures of about 6.89 MPa to about 20.67 MPa over a time period of about 3 to about 9 days. During this stage, the pressurizing medium is in contact with the composite part until it degrades to SiC, $SiO_2$, etc. Before it degrades it maintains pressure helping to avoid delamination and to increase the density of the composite. After it degrades the decomposition products (e.g. SiC) may coat the article in a desirable manner.

This process also enables two or more of the separate stages to be combined into a continuous process. Thus, the composite part does not have to be removed from a mold at the end of each stage to allow for further shrinkage. The manufacturing process is shortened since the time separations between stages can be eliminated and also because the stages themselves are shortened.

Optionally a redensification step is used to densify the article providing improved mechanical properties. Redensification comprises placing the graphitized article in a pressure vessel with sufficient resin (adequate to fill the interstices of the pyrolized part) on the surface, drawing a vacuum to remove air from the interstices, applying heat (about 83° C. to about 93° C.) to reduce resin viscosity and then applying about 6.89 MPa to about 20.67 MPa pressure. Then the carbon-carbon composite is again brought through a cure, post-cure, carbonization and graphitization cycles. At each of these steps the advantages cited above are again present.

The particular medium useful in the present invention is a critical component to the apparatus. Its responsiveness to temperature and pressure coupled with its flowability and solid nature enable it to be useful with the present invention. These properties cause the medium to produce an advantageous, substantially uniform, controllable pressure on the surface of the article precursor. And while this material is described in terms of a polymeric medium, other materials (such as a polymer molten metal mixture) which would have all the characteristics and produce similar results could be substituted. Although a single type of pressurizing medium can be used as stated above, two different types of media are preferentially used in a dual media system.

By utilizing two types of medium (a high temperature medium close to the carbon-carbon composite and a low temperature medium further from the medium) the lower cost low temperature medium can be utilized. If the low temperature medium were placed near the carbon-carbon precursor composite the higher localized temperatures would effectively degrade the polymer medium. However, the higher temperature medium will function as a pressurizing medium throughout the carbonization step. Such a dual medium system is disclosed in commonly assigned copending U.S. application Ser. No. 907,947 entitled "Method for Molding Using a Dual Solid Flowable Polymer System", the disclosure of which is hereby incorporated by reference. The high temperature medium is disclosed in commonly assigned copending application Ser. No. 907,946 entitled "High Temperature Solid Flowable Polymer Medium and Method of Molding Using the Same", the disclosure of which is hereby incorporated by reference. The low temperature medium is disclosed in commonly assigned copending application Ser. No. 907,959 entitled "Solid Flowable Polymer Molding Medium", the disclosure of which is hereby incorporated by reference. Below is a description of the two types of polymer medium beginning with the low temperature medium.

In a typical embodiment of the invention, the polymer is an unfilled silicone rubber particulate of $-4+30$ U.S. mesh sieve size (4.7-0.42 millimeters (mm)), which when pressurized, is sufficiently self-complaint to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn., USA), believed to be essentially the material which is described in the Bruner U.S. Pat. No. 3,843,601 is also useful with the present invention.

While the preferred materials are silicone rubbers, other polymer materials having the desired characteristics can be used. Most silicone rubbers are temperature limited for long term use, e.g. typically up to about 288° C. (550° F.). Fillers and other adulterants (such as the metal particulates described below) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 centimeters (cm) square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on a 40 mesh screen.

The aforementioned behavior of the polymer enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present media from those which have been used heretofore, for example, in a pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Thus, generally it can be said that the medium will have flowability, i.e., mass transport can occur when molding pressures are applied. The preferred medium, when tested in the apparatus described above using 10.3 MPa and a 15.2 cm pipe, has a flow rate of at least 0.6 gram per second (g/s), typically 6 g/s, and desirably 25 g/s. Further description of the low temperature polymer portion of the dual medium system is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. Because of this and their inherent resilience, a substantially uniform hydraulic-like pressure is applied to the article precursor surface. Tests show that the 8017 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, L and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed. gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with media having low strength, the ability to self-comply under molding level pressures, and the ability to flow and exhibit hydraulic-like behavior. The toward friability, compared to the SILASTIC TM tooling rubbers (Dow Corning, Midland, Mich.), has been observed and is believed associated with the flowability behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%.

Having above described the low temperature medium the high temperature medium is now described.

The typical high temperature polymer medium is an unfilled vinylmethylsiloxane-dimethylsiloxane copolymer (VMS-DMS) particulate of −4+30 U.S. mesh sieve size (4.7–0.42 mm), which when pressurized, is sufficiently self-compliant to coalesce as an essentially void-free medium at a pressure of the order of 0.103 to 0.138 MPa (15 to 20 psi).

Typically, a high vinyl content VMS-DMS containing rubber is used as the high temperature pressurizing medium. Most preferably, the rubber is an improvement on the low temperature medium identified above. By high vinyl content is meant about 10% to about 100% vinylmethylsiloxane. Exemplary VMS-DMS compositions are described in U.S. Pat. No. 4,581,391 assigned to the U.S.A., the disclosure of which is hereby incorporated by reference. These vinyl siloxanes may be produced by conventional commercial procedures. It is especially preferred that a vinyl siloxane having about 40% to about 60% vinyl groups is used because they remain elastomeric at higher temperatures (e.g. about 454° C. to about 482° C.). A preferred material which has been used thus far is the experimental unfilled vinyl siloxane material designated as No. 8026 by the Dow Corning Corporation (Midland, Mich.).

Other Dow Corning vinyl polymers Nos. X5-8800, 8801, 8024 and 8025 are also useful. The QCII-1010X polyvinylmethylsiloxane (Quantum Company, Michigan) is also useful with the present invention.

While the preferred materials are VMS-DMS rubbers (elastomers) other polymer materials having the desired characteristics can be used. For example, methylphenysiloxane (MPS), vinylmethylsiloxane containing thermal stabilizers and silphenylene have excellent high temperature and flow properties. Fillers and other adulterants (such as metal particulates) can be included with and within the medium, provided the essential behavior properties (e.g. flowable) are maintained.

In a similar fashion to the preferred low temperature medium the preferred high temperature medium (vinyl siloxane rubber) is characterized by low strength and high friability.

The preferred 8026 material has a Shore A hardness of less than 15 and compressive strength of the order of 3 MPa when measured on a 2.5 cm square by 1.27 cm thick specimen, and upon a compression deformation of about 40 percent it shears into smaller particles. Again the preferred polymer 8026 (like the low temperature medium) useful with the present invention when forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on a 40 mesh screen.

In one embodiment of the invention, the polymer has a Shore A hardness of less than about 15, and desirably less than 10; the compressive strength is less than 0.345 MPa (50 psi), and desirably less than 0.207 MPa (30 psi).

Again, the high temperature medium is characterized by its ability to flow. Thus, generally it can be said that the medium will have flowability, i.e., mass transport can occur when molding pressures are applied. The preferred medium, when tested in the apparatus described above using 10.3 MPa and a 15.2 cm pipe, has a flow rate of at least 0.6 g/s, typically 6 g/s, and desirably 25 g/s.

As with the low temperature medium the high temperature medium particles self-comply and coalesce into a continuous void-free body. Because of this and their inherent resilience, a substantially uniform hydraulic-like pressure is applied to the article precursor surface. Tests show that the 8026 material will tend to coalesce upon the application of moderate compressive pressure, of the order of 125–150 kPa; at this point the interfacial boundaries between the particles are so essentially conformed that the compressed rubber becomes translucent instead of opaque. The 8026 material has a true density of 0.97 g/cc, an apparent bulk density of 0.5 g/cc as a −30 mesh size powder, and it is compressed to a coalesced translucent material with a density of 0.90–0.97 g/cc by the application of about 150 kPa (21.8 psi). (Further compression of captured material, in the range 150 kPa (21.8 psi) to 13.8 MPa (2000 psi), shows it to have about 0.4% volume change per 10 MPa (1450 psi).) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 250 kPa, preferably 150 kPa; more preferably about 100 kPa.

In addition to the above-described properties, the high temperature medium (unlike the low temperature medium) is capable of flowing at temperatures and pressures in excess of about 316° C. (600° F.) and 0.689 MPa (100 psi), respectively. By capable of flowing is meant providing essentially uniform isostatic pressure (within about 10%). This facilitates molding at the higher temperatures that carbon-carbon composites require. Specifically, the vinyl silanes having about 40% to about 60% vinyl groups are capable of flowing at temperatures below room temperature to about 538° C. (1000° F.) at pressures of about 0.689 MPa (100 psi) to about 20.682 MPa (3000 psi). It is believed that pressures up to 20,000 psi can be used. Another property characterizing the high temperature medium and differentiating it from the low temperature medium is that the medium is substantially thermally stable for use at temperatures in excess of about 316° C. (600° F.). By substantially thermally stable is meant the medium remains sufficiently flexible (elastic) to transmit molding pressure to an article during its entire cure cycle. Thus as temperatures in excess of about 900° F., the polymer can still function as a load transfer medium. It is critical that at these temperatures, the polymer must be chemically stable such that it will not revert (depolymerize) resulting in oily residue as these oils are very intrusive and can contaminate the article being molded (e.g. resin containing composite). These polymers may give off small amounts of decomposition products which may be removed by a suitable gas vent in the pressure vessel. This property facilitates processing (molding) at the higher temperatures that carbon-carbon composites require. Mediums that are not stable above these temperatures do not work in the present invention as they revert to oily monomers or decompose. Alternatively, portions of the polymer may be transformed (e.g. pyrolyzed) to a hardened state and even upon being ground are not flowable. The pyrolyzed polymer, however, will transmit molding pressure to an article if sufficient unpyrolyzed material remains to back it up.

Specifically, the vinyl silanes having about 40% to about 60% vinyl groups are capable of transmitting molding pressure at temperatures up to about 649° C. (1200° F.) at pressures of about 0.682 MPa (100 psi) to about 20.68 MPa (3000 psi). It is also believed that pressures as high as about 137.88 MPa (20,000 psi) will work.

Silicone rubbers other than 8026 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

As with the low temperature material an even pressure on various points of the article to be molded is important. Comparative tests run on the granular 8026 material showed a maximum variation in pressure of as low as 350 kPa (0.35 MPa) (51 psi) typically less than about 210 kPa (0.21 MPa) (31 psi) at about 6.9 MPa (1000 psi) nominal pressure; other useful materials produced pressure uniform with 10%.

The low and high temperature media have only been characterized according to the properties of some currently available materials; the data are insufficient to establish that the totality of measured properties in combination are necessary. On the contrary, to a significant extent it is believed there is a redundancy and that they independently characterize the invention.

The "carbon" fibers used in this disclosure are typically carbon or graphite and can be made by pyrolyzing organic precursor fibers such as polyacrylonitrile, rayon or pitch. They are also commercially available as WCA fibers from Union Carbide (Danbury, Conn.).

The resins used for carbon-carbon are known to those skilled in the art. Examples include phenolics, furfural and polybenzimidazole. It is preferable to use CA2223 available from Ferro Company, (Culver City, Calif.). Another preferred material is USP39 available from U.S. Polymeric (Santa Ana, Calif.).

EXAMPLE

An FM 5064 G prepreg (U.S. Polymeric) containing 34% by weight USP 39 phenolic resin available from U.S. Polymeric and 66% by weight woven graphite fabric and carbon filler was laid up and debulked on three sides of a square molding tool. The article was covered with a layer of TEFLON TM coated glass (Armalon) fabric available from T.M.I., Inc. (Salt Lake City, Utah) and one layer of glass fabric (bleeder) style 1581, available from T.M.I., Inc. in communication with a vacuum vent. A layer of aluminum foil 0.0177 mm (0.0007 inch thick) was placed over the glass fabric, stopping short of the vent. Then a second layer of glass fabric was placed over the aluminum foil and vent to form a "breather" layer to aid in the removal of volatiles. A final covering of three layers of aluminum foil was placed over the assembly and taped to the mandrel.

The prepared mold assembly was placed into a pressure vessel for processing. An aluminum foil cylinder, providing approximately a 3.8 cm (1½ inch) radial clearance around the article, was placed into the vessel. The tube was then carefully filled with 8026 medium. The cylindrical tube was supported by a tooling disc at the base of the mold mandrel. When sufficient medium was introduced into the tube, the foil was squeezed and flatened to form the medium into an essentially uniformly thick blanket. The foil barrier was then surrounded with 8017 medium.

Heating was provided to the tool/mold assembly to properly cure the article. Heating and cooling were also provided to a control coil to maintain the desired pressure conditions.

The article was processed through a continuous "one-step" cycle. That is, the cure cycle was immediately followed with a post-cure and a carbonization step. The article was never removed from the tooling between steps, as is usually done. Cure, post-cure, and carbonization cycles are as follows:

| Cure, post-cure, and carboniazation cycles are as follows: | |
|---|---|
| Temperature (°F.) | Time (Minutes) |
| 97 | 0 |
| 180 | 60 |
| 180 | 90 |
| 240 | 150 |
| 240 | 180 |
| 310 | 240 |
| 310 | 360 |
| 350 | 420 |
| 350 | 540 |
| 500 | 720 |
| 500 | 780 |
| 550 | 840 |
| 550 | 900 |
| 700 | 1080 |
| 700 | 1140 |
| 750 | 1200 |
| 750 | 1260 |
| 1000 | 1560 |
| 1000 | 1620 |

A stepped cycle as follows was also used for the medium pressure.

| Pressure (psi) | Time (Minutes) |
|---|---|
| 30 | 0 |
| 50 | 0 |
| 50 | 60 |
| 1000 | 75 |
| 1000 | 1635 |
| 0 | 1650 |

Full vacuum (26 inches Hg) was drawn on the tool through the bleeder/breather layers from the beginning.

The above example resulted in a part with a specific gravity of 1.28 whereas conventional carbonized articles would have a specific gravity less than 1.2.

Although this disclosure has been primarily directed to carbon-carbon composites, the concepts herein can be used for molding silicon carbide fiber and ceramic fiber composites.

This process reduces the cure/carbonization cycle time from 10-15 days to less than 36 hours. As a onestep process, it eliminates separate cure post-cure and carbonization cycles. The higher densities achieved by this process necessitate fewer redensification cycles. Also, the reduction/prevention of delaminations reduces waste parts. Finally, the molding pressure results in stronger composite parts as typically the carbonization and graphitization cycles have previously been done without pressure (on. free standing parts).

This invention makes a significant advance in the field of molding carbon-carbon composites by providing a continuous manufacturing process that maintains pressure on the composite achieving denser more defect free parts.

It should be understood that the invention is not limited to the particular embodiment shown and described herein, but that various changes and modifications may be made without departing from the spirit or scope of this concept as defined by the following claims.

What is claimed is:

1. A method for making a carbon-carbon composite comprising:
   (a) disposing a resin impregnated carbon fiber reinforced prepreg in a pressure vessel;
   (b) substantially filling said pressure vessel with a solid flowable particulate polymer;
   (c) exposing said prepreg to temperatures and pressures sufficient to cure said prepreg to form a carbon-carbon precursor;
   (d) exposing said carbon-carbon precursor to temperatures and pressures sufficient to post-cure said carbon-carbon precursor; and
   (e) exposing said post-cured carbon-carbon precursor to temperatures and pressures sufficient to carbonize said post-cured carbon-carbon precursor to form a carbon-carbon composite;
   wherein said curing, postcuring, and carbonization is a continuous process and said carbon-carbon composite has high strength.

2. The method of making a carbon-carbon composite as recited in claim 1 wherein said solid flowable polymer comprises a particulate silicon polymer having a nominal flow rate of at least 0.6 gram per second through a 1.1 centimeter diameter pipe 7.6 centimeters long under applied pressure of 10.34 MPa.

3. The method of making a carbon-carbon composite as recited in claim 1 wherein said carbon-carbon composite is exposed to temperatures and pressures sufficient to graphitize said carbon-carbon composite.

4. The method of making a carbon-carbon composite as recited in claim 1 wherein said graphitized carbon-carbon composite is redensified.

5. The method of making a carbon-carbon composite as recited in claim 1 wherein said solid flowable particulate polymer is capable of producing a substantially uniform predetermined medium pressure on the surface of said prepreg.

6. A method for making a carbon-carbon composite comprising:
   (a) disposing a resin impregnated carbon fiber reinforced prepreg in a pressure vessel;
   (b) substantially filling said pressure vessel with a solid flowable particulate polymer;
   (c) exposing said prepreg to temperatures and pressures sufficient to cure said prepreg to form a carbon-carbon precursor;
   (d) exposing said carbon-carbon precursor to temperatures and pressures sufficient to post-cure said carbon-carbon precursor; and
   (e) exposing said post-cured carbon-carbon precursor to temperatures of about 538° C. to about 816° C. and pressures sufficient to carbonize said post-cured carbon-carbon precursor to form a carbon-carbon composite;
   wherein said curing, postcuring and carbonization is a continuous process and said carbon-carbon composite has high strength.

* * * * *